United States Patent [19]

Hollis

[11] 3,719,247

[45] March 6, 1973

[54] GOLF CART

[76] Inventor: Roger M. Hollis, 2823 Gulf of Mexico Drive, Longboat Key, Sarasota, Fla.

[22] Filed: April 7, 1971

[21] Appl. No.: 132,127

[52] U.S. Cl.................180/19 H, 180/65 R, 192/67, 192/108, 280/DIG. 5
[51] Int. Cl. ............................................B62d 51/04
[58] Field of Search ......180/19 R, 19 H, 19 S, 25 A, 180/27, 65; 192/49, 67; 280/DIG. 5

[56] References Cited

UNITED STATES PATENTS

| | | | |
|---|---|---|---|
| 3,167,146 | 1/1965 | Rudolph | 180/19 R |
| 2,879,858 | 3/1959 | Thomas | 180/19 H |
| 2,888,114 | 5/1959 | Bostock | 192/49 X |
| 3,199,621 | 8/1965 | Seaman | 180/19 R |
| 1,764,851 | 6/1930 | Palm | 180/19 H |
| 3,356,172 | 12/1967 | Peckham et al. | 180/19 S |

FOREIGN PATENTS OR APPLICATIONS

| | | | |
|---|---|---|---|
| 1,034,469 | 7/1966 | Great Britain | 180/19 R |

*Primary Examiner*—Leo Friaglia
*Assistant Examiner*—John A. Pekar
*Attorney*—Hofgren, Wegner, Allen, Stellman & McCord

[57] ABSTRACT

A collapsible powered two-wheel golf bag cart including a frame, collapsible leg structures on the frame each carrying one wheel, golf bag support means on the frame, a handle on the frame for manipulating the cart, a power unit detachably supported on the frame between the wheels, an electric motor in the power unit, an output shaft from the power unit, a disconnectible coupling for connecting the output shaft to drive one of the cart wheels, a disengageable clutch in the power unit connecting the motor and the output shaft, a battery in the power unit in circuit with the motor, and circuit control means on the handle for energizing the motor forwardly or reversely and for varying the speed of the motor.

14 Claims, 7 Drawing Figures

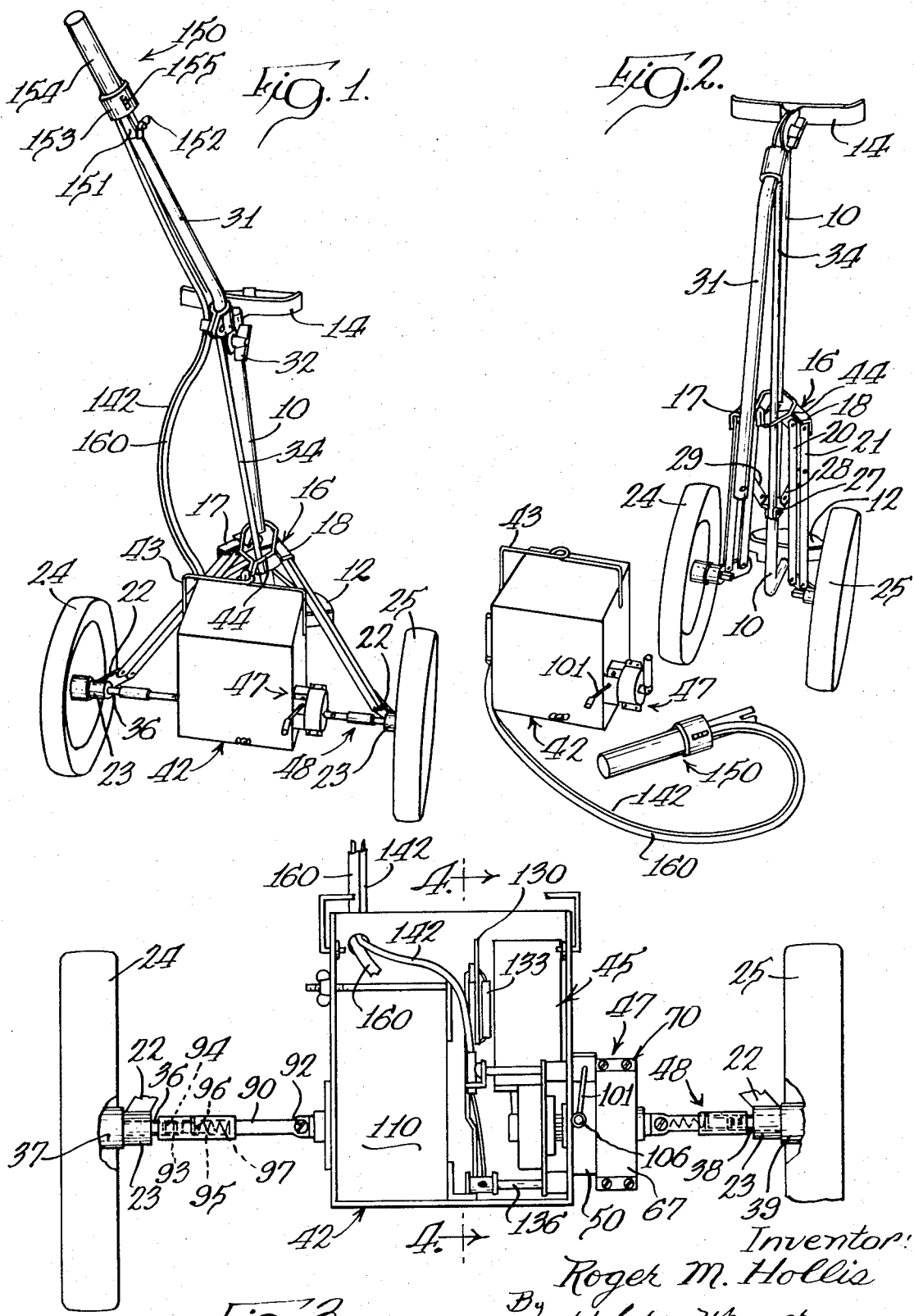

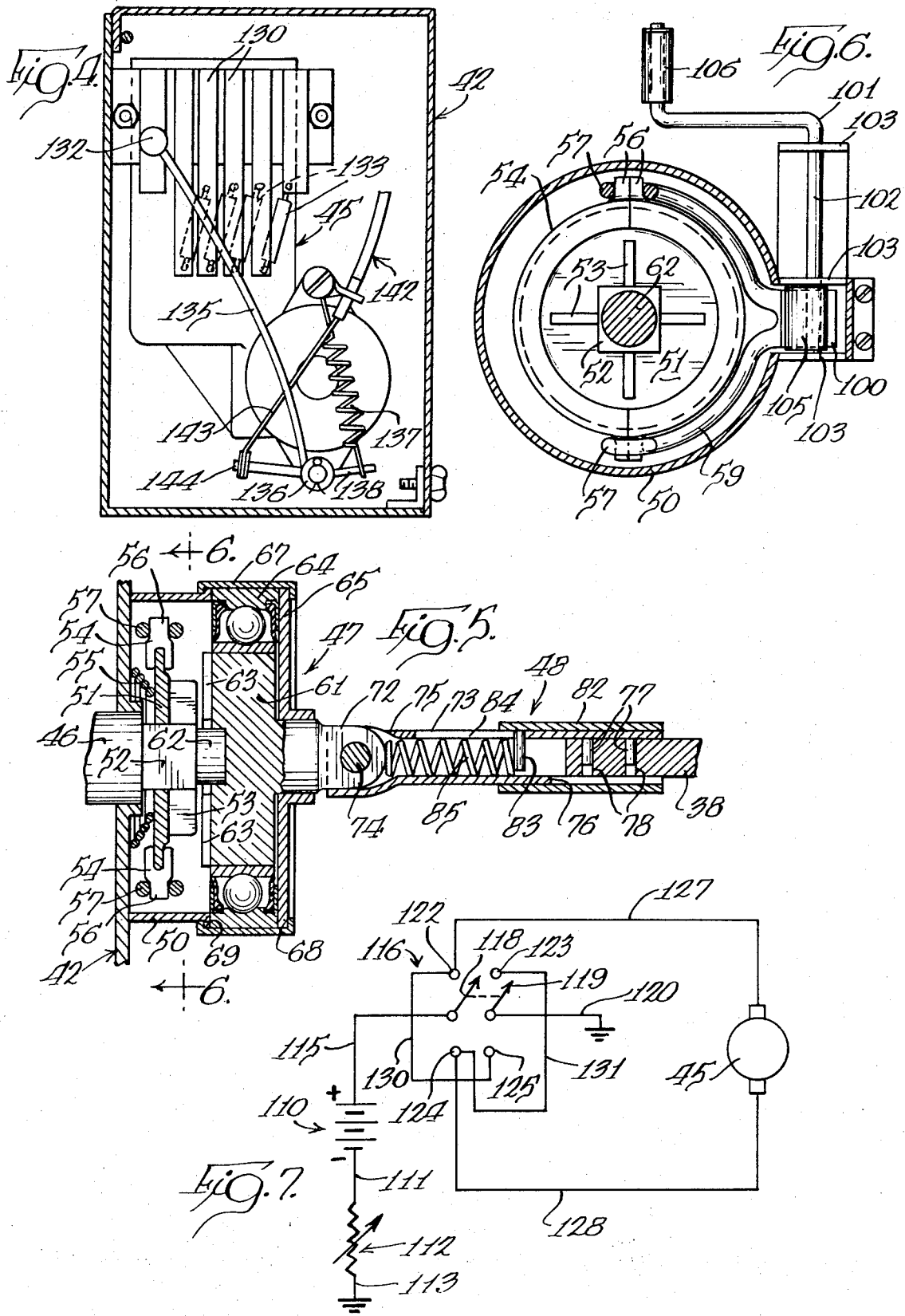

GOLF CART

BACKGROUND OF THE INVENTION

For many years, it has been conventional for golfers to utilize personally manipulated golf bag carts for transportation of bags with clubs and other accessories in lieu of using caddies. For the most part, such golf bag carts have been of two wheel constructions because of the simplicity and maneuverability provided in such structures. Usually, a frame is supported by the two wheels in a way such that the center of gravity of the frame is located forwardly of the axis of the wheels and the lower end of the frame rests on the ground for stability when the cart is unattended. Manipulation of the cart is facilitated by a handle extending from the frame rearwardly across the axis of the wheels in a direction away from the frame.

In many instances, two-wheel golf bag carts of the type described have been constructed for collapsibility in a way to encourage private ownership. That is, collapsible carts are made in a way such that in extended condition they provide suitable stability and maneuverability for durable use, and at the same time they are adapted to be collapsed into a compact structure requiring minimum storage space so that when they are not in use they may be conveniently kept in a storage trunk in an automobile.

With the passage of time and the modern tendency toward mechanization, power ultimately was applied to golf bag carts. However, in providing power units for golf bag carts, it often was necessary to add additional frame structure and in order to support the additional frame structure, it became necessary to provide additional wheel support. Thus, with mechanization came complication which not only enlarged the construction, but also restricted collapsibility and therefore limited flexibility of use. Further, with the advent of power came the provision of a suitable drive train from a power source to one or more cart wheels which resulted in a braking effect in event of manual manipulation of the cart on failure of the power, because the inertia of the power system restricted maneuverability of the cart.

SUMMARY OF THE INVENTION

It is a general object of the present invention to provide a new and improved golf bag cart which is of two-wheeled construction in order to retain the advantages of simplicity and maneuverability, which is powered in order to provide for propulsion of the cart, and which is collapsible in order to provide for convenient storage.

More particularly, the present invention includes a generally upright central frame having collapsible leg structures each carrying one cart wheel, and a detachable power unit removably supported on the frame between the wheels and with its center of gravity located forwardly of the axis of the wheels so that the stability of the cart is not upset. The power unit includes a drive motor and an output shaft adapted for disengageable coupling with one of the cart wheels so as to provide positive propulsion.

In the preferred embodiment illustrated, the power unit is removably hung on the central frame, detachably coupled to one of the cart wheels and additionally braced against the leg structure for the other cart wheel, so that in use the cart is reliably driven by the power unit which in turn is adequately supported for good performance without upsetting stability of the cart in use, and yet the power unit is disconnectible to permit collapse of the cart for convenient storage of the cart and power unit.

An important feature of the invention resides in the provision of a disengageable clutch in the power unit between the motor and the output shaft connected to the propulsion wheel, so that in the event of motor failure, the clutch may be disengaged in order to permit free wheeling so that the cart may be manually propelled.

In a preferred construction shown herein, electric power is supplied to the propelling motor by means of a storage battery mounted adjacent the motor. In circuit with the battery and the motor there is provided a switch means for deenergizing the motor or energizing the motor forwardly or reversely. Additionally, the circuit includes variable resistance means adapted to vary the speed of the motor to suit the golfer. The motor controls are conveniently mounted on the handle manually accessible for maneuvering the cart.

BRIEF DESCRIPTION OF THE DRAWINGS

FIG. 1 is a perspective view of a golf bag cart with a power unit embodying the principles of the present invention;

FIG. 2 is a perspective view showing the power unit detached and the golf bag cart collapsed;

FIG. 3 is a fragmentary enlarged rear elevational view, at the level of the power unit and wheels;

FIG. 4 is a sectional view taken at about the line 4—4 in FIG. 3 showing the drive motor and variable resistance therefor;

FIG. 5 is a fragmentary enlarged sectional view through the drive clutch and shaft coupling;

FIG. 6 is a sectional view taken at about the line 6—6 on FIG. 5 illustrating the clutch actuator; and FIG. 7 is a wiring diagram.

DETAILED DESCRIPTION OF PREFERRED EMBODIMENT

Referring now to the drawings in more detail, the collapsible cart construction includes an upright central frame member or post 10 which has at the lower end a plate or the like at 12 for supporting the bottom end of a golf bag. At the upper end of the post 10 there is an open bracket 14 adapted to support the upper end of a golf bag. Usually, the bracket as at 14 includes a suitable belt or strap for holding the golf bag on the golf cart, and the support 12 at the bottom may include a similar securing means.

Approximately at the mid portion of the post 10 there is a fixed wing-shaped bracket 16 including a left-hand rearwardly and outwardly extending projection 17 and a right-hand outwardly and rearwardly extending projection 18 for pivotally collapsibly supporting the golf cart wheel structure. As illustrated, each of the projections 17 and 18 supports a pivoted linkage including a pair of links 20 and 21 which are substantially vertically disposed when the cart is collapsed. At the lower ends, the links 20 and 21 are pivotally connected to a generally horizontally disposed bracket 22 which terminates at the outboard end in a cylindrically shaped shaft support or bearing 23 respectively for supporting a left-hand wheel 24 and a right-hand wheel 25, the latter of which functions as a drive wheel.

In order to extend the wheels 24 and 25 outwardly to the positions illustrated in FIG. 1 for use of the cart, and in order to collapse the wheels inwardly to the positions shown in FIG. 2 for compact storage, the links 20 and 21 are swingable about the supporting bracket extensions 17 and 18. To this end, the lower end of the central upright post 10 carries a slidable collar 27 which has one link 28 pivotally mounted thereon and extending outwardly to a pivotal connection with the right-hand link 21, and a second link 29 pivotally mounted thereon and extending outwardly to the left-hand link 21. The arrangement is such that if the collar 27 is moved upwardly on the post 10 toward the bracket 16, the wheels are forced outwardly to the positions shown in FIG. 1. On the other hand, if the collar 27 is moved downwardly on the post 10, the wheels are moved toward each other to the collapsed position illustrated in FIG. 2.

In order to slide the collar 27 upwardly and downwardly on the lower end of the post 10, the post 10 has a handle extension 31 pivotally mounted thereon and adapted to be locked in adjusted positions by a clamp 32. When the handle 31 is moved upwardly to the position shown in FIG. 1, it occupies a position which makes it convenient to manipulate the cart. When the handle portion 31 occupies the lower position illustrated in FIG. 2, it is compactly disposed to facilitate storage of the cart. A link 34 is pivotally connected to the handle portion 31 and pivotally connected to slidable collar 27 in a manner to raise the collar when the handle is raised and to lower the collar when the handle is lowered. Thus, if the cart is tilted forward to rest the bag support 12 on the ground, with the wheels elevated, the handle portion 31 may be moved between the positions of FIG. 1 and FIG. 2 for extending and collapsing the wheel structure.

In order to appropriately mount the wheels 24 and 25, the left-hand support bracket 23 has a fixed pin 36 therein rotatably supporting the wheel 24 through the medium of appropriate bearing means in wheel hub 37. The right-hand bearing bracket 23 rotatably supports a stub shaft 38 through the medium of appropriate bearing means. The sub shaft 38 is affixed to the hub 39 of wheel 25 for rotation therewith. As will appear, power is applied to the stub shaft 38 to drive the wheel 25 in a manner to propel the cart.

A power unit is removably attachable to the cart in its extended position as illustrated in FIG. 1. The power unit includes a housing 42 and a pivotally mounted supporting hanger 43 adjacent the upper end adapted to hang from a bracket 44 pivotally mounted on the central post 10 and resting on the fixed bracket 16. The housing 42 contains a combined electric motor and gear box 45 including an output gear driving an output shaft 46. The output shaft 46 is adapted to drive the stub shaft 38 through a disengageable clutch 47 and a disconnectible coupling 48.

The clutch 47 is disposed in a cylindrical casing 50 on the side of housing 42 and includes a driving clutch disc 51 slidable axially on the square end 52 of drive shaft 46 and including angularly spaced axially outwardly extending clutch teeth 53. The clutch member 51 is rotatably mounted in a two-piece carrier 54 and urged toward the right as viewed in FIG. 5 by a coiled spring 55 bearing between the housing 42 and the clutch disc 51. The carrier 54 includes diametrically opposite outwardly extending projections 56 each engaged by an eyelet 57 on a clutch actuator in the form of a yoke 59. As will appear, the yoke 59 is utilized to shift the clutch member 51 toward and away from a driven clutch member 61, having complementary recesses 63 for receiving clutch teeth 53.

In order to support the driven clutch member 61, the output shaft 46 from the motor unit is formed with a reduced cylindrical extension 62 which fits in a complementary recess in the clutch member 61 to pilot the latter. Additionally, the clutch member 61 is rotatably mounted through the medium of suitable bearings in an outer bearing race 64. The clutch member 61 and the bearing race 64 are enclosed by an end disc 65, and the assembly is clamped on the clutch housing 50 by a pair of clamp members 67 and 68 which are semicircular and channel-shaped in cross section to fit over the end cover disc 65 and an outwardly extending flange 69 on the clutch housing 50. The channel-shaped clamp members 67 and 68 of half circular configuration are bolted together at mating ends, as indicated generally at 70.

The driven clutch member 61 includes an outwardly extending drive shaft stub 72, and the end of the stub 72 has a hollow drive tube 73 pivotally mounted thereon as at 74. As seen in FIG. 5, the upper portion of tube 73 is slotted at 75 so that the tube 73 may pivot upwardly about the pivot axis 74. The outer end of drive tube 73 has a slot at 76 in the lower portion thereof and has a pair of axially spaced diametrically projecting pins 77 opposite the slot 76. The pins 77 are receivable in apertures 78 in the stub shaft 38 of the right-hand cart wheel 25 in order to provide a drive coupling therewith. The coupling is retained in driving condition by means of a sleeve 82 slidable on the drive tube 73 and including a radially disposed pin 83 projecting through a slot 84 in the drive tube and engaged by coiled spring 85 which abuts the drive shaft 72 and tends to maintain the sleeve 82 in the outwardly disposed position illustrated in FIG. 5.

In operation, when the power unit is installed on the golf cart with the disconnectible coupling in driving connection as illustrated in FIG. 5, it will be understood that the coupling may be disconnected by slidably moving the outer sleeve 82 to the left against the bias of spring 85 until such time as the sleeve clears the end of the stub shaft 38 and the end of drive tube 73 may be pivoted upwardly about the pivot axis 74 to withdraw the pins 77 from the recesses 78 in the stub shaft 38. In order to assemble the power unit on the golf cart to apply power to the stub shaft 38 of the drive wheel 25, the reverse procedure is followed in a manner such that the outer sleeve 82 is retracted against the spring 85 so that the drive tube 73 may be pivoted downwardly to position the pins 77 in the apertures 78 in the stub shaft 38, whereupon the sleeve 82 may be released for movement by the spring 85 to the position illustrated in FIG. 5.

In order to appropriately brace the power unit in position for driving the golf cart, a disconnectible coupling is also provided between the housing 42 and the fixed stub 36 associated with the left wheel 24.

More particularly, a mounting tube 90 (FIG. 3) is pivotally mounted at 91 on the housing 42 to swing upwardly from the position illustrated in FIG. 3. At the outer end, the tube 90 is slotted at the lower portion as at 93. A pair of diametrically projecting pins 94 in the tube 90 are disposed opposite the slot 93 and adapted to fit in corresponding apertures in the stub 36. In order to maintain appropriate connection between the mounting tube 90 and the stub projection 36, an outer sleeve 95 is slidable on the tube 90 and includes a pin 96 projecting through a slot in the mounting tube. A spring 97 acts between the pin 96 and the tube 90 to normally bias the tube outwardly. The coupling is connected and disconnected in a manner similar to that described in connection with drive coupling 48.

In order to move the driving clutch member into and out of driving engagement with the driven clutch member 61, the clutch actuating yoke 59 is formed with a flat rectangular head 100 (FIG. 6) which projects outwardly from the clutch housing 50 and is adapted to be controlled by a manually operable hand crank 101. In particular, the crank 101 includes a shaft 102 rotatably mounted in brackets 103 on the housing 42 and having an eccentric cam 105 adapted to contact the yoke head 100. The crank includes a manually accessible hand knob 106.

In operation, when the crank handle is moved in a counterclockwise direction (FIG. 1, 3), to the position shown in FIG. 3, the eccentric cam 105 is retracted from the yoke head 100 (as shown in FIG. 6) and the clutch spring 55 causes movement of the driving clutch disc toward the driven clutch member 61 so that the driving clutch teeth 53 project into the complementary recesses 63. When the crank handle is rotated in a clockwise direction from the position of FIG. 3, the eccentric cam 105 is forced against the flat yoke head 100 and the yoke is forced toward the housing 42 in a manner to retract the carrier 54 and the driving clutch disc 51 so that teeth 53 are withdrawn from the recesses 63 in the driven clutch member 61, as shown in FIG. 5. In this manner, the motor is disconnected from the cart wheel so that the cart may be manually wheeled in event that the drive motor will not operate properly as, for example, when there is power failure due to a dead battery.

Referring now to the wiring diagram of FIG. 7, the motor 45 is adapted to be supplied with power from a battery 110 mounted in the housing 42 and connected by wire 111 to a variable resistance 112 in turn connected by wire 113 to ground. The opposite positive side of the battery 110 is connected by a wire 115 to a double pole-double throw switch 116 having three positions respectively for deenergizing the motor 45 and for energizing the motor forwardly and reversely. For example, the switch 116 may include two movable switch contacts 118 and 119 movable together and connected respectively to the wire 115 and a wire 120 leading to ground. In an intermediate position, the contacts 118 and 119 provide for deenergization of motor 45. In order to operate the motor forwardly, the contacts are moved respectively to engage stationary contacts 122 and 123, and in order to operate the motor reversely, contacts 118 and 119 are moved respectively to engage contacts 124 and 125. The contact 122 is connected by wire 127 to one side of motor 45, and contact 124 is connected by wire 128 to the other side of motor 45. Contacts 122 and 125 are connected by a wire 130 while contacts 123 and 124 are connected by a wire 131.

In operation of the motor forwardly, power is supplied from the battery 10 through the wire 115, contact 118, contact 122 and wire 127 while the opposite side of the motor goes to ground through wire 128, contact 124, wire 131, contact 123, contact 119 and wire 120. In operation of the motor reversely, power is supplied to the motor through wire 128 and the motor is grounded through the wire 127.

The variable resistance 112 is illustrated in FIG. 4 where a plurality of copper strips 130 are shown mounted in the housing 42 to permit movement of a brush or contact 132 relative thereto. The copper strips have appropriately associated resistance coils 133 connected in series with the copper strips. The last in the series of copper strips 130 and resistances 133 (at the right in FIG. 4) is connected by wire 111 to the battery 110. The movable contact 132 is carried at the end of a long arm 135 on a rotatable shaft 136 suitably mounted in the lower portion of housing 42 and grounded. The shaft 136 is biased in a counterclockwise direction as shown in FIG. 4 by means of a spring 137 having one end connected to a projection 138 from the shaft 136 and the opposite end appropriately anchored in the housing as at 140. In the position illustrated, the spring 137 biases the movable contact 132 to a position where the entire series of resistances 133 is provided in the battery circuit to produce a minimum current in the circuit to motor 45 so that the cart will not usually be propelled if loaded. The shaft 136 may be moved in a clockwise direction to gradually reduce the resistance in circuit with the battery and thereby increase the current to the motor 45 and increase the speed of operation thereof and the speed at which the cart is propelled. Movement of the shaft 136 in a clockwise direction is effected by means of a Bowden cable 142 including an outer sheath and an inner wire 143 having a lower end connected to an arm 144 on the shaft 136. AS will appear, the Bowden cable wire 143 may be operated from the handle of the cart.

Referring now to FIG. 1, the upper end of the adjustable handle portion 31 is adapted to carry a hand grip assembly 150 including a lower stationary tubular support 151 adapted to be suitably clamped to handle portion 31 as by winged screw 152. The tubular mounting portion 151 carries a stationary housing 153 and a rotatable handle 154. The rotatable handle 154 has an appropriate connection with the upper end of Bowden cable wire 143 such that rotation of the handle in a counterclockwise direction moves the shaft 136 in a clockwise direction to reduce the resistance in the motor circuit.

The stationary housing 153 in the hand grip assembly includes the double pole-double throw switch 116 together with an appropriate operating button 155 for movement between off, forward, and reverse positions.

Preferably, the wires 115, 120, 127 and 128 leading from the power unit housing 42 are gathered together in a common bundle 160 so that there is a single harness leading from the housing up to the hand grip assembly. The Bowden cable 142 may be arranged adjacent the wiring harness from the housing 42 to the hand grip assembly.

I claim:

1. A collapsible powered golf cart, comprising,
   a. a central upright frame,
   b. a collapsible leg structure pivotally mounted at each side of a mid portion of the frame each carrying a rotatable wheel,
   c. golf bag support means disposed on the frame,
   d. a power unit including a housing removably hung on the frame between the collapsible leg structures,
   e. a motor unit in the housing including a drive motor and an output shaft driven by the motor and projecting outwardly from one side of the housing toward one wheel, and
   f. a manually disconnectible coupling connecting said output shaft and said one wheel so that the cart may be propelled by the power unit and the power unit may be removed from the cart without tools to permit collapse of the cart.

2. A cart as defined in claim 1 including a disengageable clutch connecting said motor and said output shaft so that the cart may free wheel in event of motor failure.

3. A cart as defined in claim 1 including a handle extending from an upper portion of the frame, a motor control on the handle, and means connecting the control to the motor.

4. A collapsible powered golf cart as defined in claim 1, including
   a. a handle on an upper portion of the frame for manipulating the cart,
   b. a hand grip detachably mounted on the handle,
   c. a motor control on the hand grip, and
   d. a cable connecting the motor control to the motor and removable from the cart with the housing and hand grip as a unit.

5. A collapsible powered golf bag cart, comprising,
   a. an upright frame,
   b. a collapsible leg structure pivotally mounted at each side of a mid portion of the frame each carrying a wheel support bracket and movable toward and away from each other between extended and retracted positions relative to the frame,
   c. a wheel rotatable on each support bracket,
   d. golf bag support means disposed on the frame so that the center of gravity of the frame is located forwardly of the axis of the wheels and the lower end of the frame rests on the ground for stability when the cart is unattended,
   e. a power unit including a housing removably supported on the frame at a position between the leg structures in a position preserving the stability of the cart,
   f. a motor unit in the housing including a drive motor and an output shaft driven by the motor and projecting outwardly from one side of the housing toward one wheel,
   g. a stub shaft rotatable with said one wheel, and
   h. a disconnectible coupling connecting said output shaft and said stub shaft and detachable from one shaft to permit removal of the power unit for collapse of the cart.

6. A cart as defined in claim 5 including a disconnectible brace connecting the housing and the support bracket for the other wheel.

7. A cart as defined in claim 5 including a disengageable clutch connecting the motor and the output shaft and means for operating the clutch.

8. A cart as defined in claim 7 including a handle extending from an upper portion of the frame for manipulating the cart, a variable resistance in circuit with the motor, and means on the handle for manipulating the resistance to vary the motor speed.

9. A collapsible two-wheel powered golf bag cart, comprising,
   a. a frame,
   b. a collapsible leg structure pivotally mounted at each side of the frame for movement toward and away from each other and each carrying a rotatable wheel,
   c. means for maintaining the leg structure extended,
   d. golf bag support means disposed on the frame so that the center of gravity of the frame is located forwardly of the axis of the wheels and the lower end of the frame engages the ground for stability when the cart is unattended,
   e. a handle extending from an upper portion of the frame for manipulating the cart,
   f. a power unit including a housing removably supported on the frame between the leg structures,
   g. a motor unit in the housing including a drive motor and an output shaft driven by the motor and projecting outwardly from one side of the housing toward one wheel,
   h. a disconnectible coupling connecting said output shaft and said one wheel and detachable from said wheel,
   i. a disconnectible brace connecting the housing and the leg structure for the other wheel and detachable from said wheel,
   j. a battery in the housing in circuit with the motor,
   k. an on-off switch on the handle in said circuit for controlling said motor,
   l. variable resistance means in said circuit, and
   m. means on the handle for varying said resistance means.

10. A cart as defined in claim 9 including a disengageable clutch connecting the motor and the output shaft, and means for actuating the clutch.

11. A collapsible two-wheel powered golf bag cart, comprising,
    a. a central upright frame,
    b. a collapsible leg structure pivotally mounted at each side of the frame each carrying a support bracket for a wheel and movable between extended and retracted positions,
    c. a collapsible handle attached to an upper portion of the frame extendable to a position accessible for manipulating the cart,
    d. means connecting the handle and the leg structures for extending the latter,
    e. means for locking the leg structures in extended positions,
    f. golf bag support means disposed on the frame so that the center of gravity of the frame is located forwardly of the axis of the wheels and the lower end of the frame engages the ground for stability when the cart is unattended,
    g. a power unit including a housing removably supported on the frame between the wheels, h. a motor unit in the housing including a drive motor and a drive shaft driven by the motor and projecting outwardly from one side of the housing toward one wheel,
i. a disengageable clutch including an input member driven by said drive shaft and an output member including an output shaft,
j. a disconnectible coupling connecting said output shaft and said one wheel,
k. a disconnectible brace connecting said housing and said leg structure for the other wheel,
l. a battery in the housing in circuit with the motor,
m. resistance means in the housing in said circuit,
n. an off-forward-reverse switch on the handle and in said circuit for controlling the motor, and
o. means on the handle for varying the resistance means in the housing.

12. A cart as defined in claim 11 wherein the resistance means in the housing includes a movable contact adjustable relative to resistances in series.

13. A cart as defined in claim 12 including a rotatable hand grip on the handle, and a Bowden cable connection from the rotatable grip to the adjustable contact in the resistance means.

14. A powered two-wheel golf bag cart, comprising, a. a frame including a central upright support and leg structures attached to opposite sides of a mid portion of the support each carrying a rotatable wheel,
b. a handle extending from an upper portion of the support for manipulating the cart,
c. golf bag holding means disposed on the support so that the center of gravity of the frame is located forwardly of the axis of the wheels and the lower end of the support rests on the ground for stability when the cart is unattended,
d. an electric motor mounted on the frame and a drive shaft operated by the motor,
e. battery means mounted on the frame in circuit with the motor,
f. circuit control means on the handle,
g. a shaft connected to one of the wheels for propelling the cart,
h. a disengageable clutch connecting the drive shaft and the wheel shaft including relatively axially movable clutch elements, and
i. means for disengaging the clutch so the cart may free wheel in event of motor failure.

* * * * *